United States Patent
Ott et al.

(10) Patent No.: US 10,488,047 B2
(45) Date of Patent: Nov. 26, 2019

(54) THERMALLY COMPLIANT ADDITIVELY MANUFACTURED FUEL INJECTOR

(71) Applicant: United Technologies Corporation, Farmington, CT (US)

(72) Inventors: Joe Ott, Enfield, CT (US); Gary A. Schirtzinger, Glastonbury, CT (US); Lexia Kironn, Rocky Hill, CT (US); Dennis M. Moura, South Windsor, CT (US); Stanley J. Funk, Southington, CT (US); Roger O. Coffey, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 260 days.

(21) Appl. No.: 15/112,985

(22) PCT Filed: Jan. 14, 2015

(86) PCT No.: PCT/US2015/011294
§ 371 (c)(1),
(2) Date: Jul. 20, 2016

(87) PCT Pub. No.: WO2015/112385
PCT Pub. Date: Jul. 30, 2015

(65) Prior Publication Data
US 2016/0348913 A1 Dec. 1, 2016

Related U.S. Application Data
(60) Provisional application No. 61/931,165, filed on Jan. 24, 2014.

(51) Int. Cl.
*F23R 3/28* (2006.01)
*F02C 7/22* (2006.01)
(Continued)

(52) U.S. Cl.
CPC ............... *F23R 3/28* (2013.01); *F02C 7/222* (2013.01); *F05D 2220/32* (2013.01);
(Continued)

(58) Field of Classification Search
CPC .... F23R 3/28; F05D 2220/32; F05D 2230/53; F05D 2250/61; F05D 2260/231; F02C 7/222
(Continued)

(56) References Cited

U.S. PATENT DOCUMENTS 4,071,194 A * 1/1978 Eckert .................. F02K 1/822
239/127.3
5,361,578 A * 11/1994 Donlan .................. F02C 3/30
60/39.55
(Continued)

FOREIGN PATENT DOCUMENTS

EP 1143196 A1 10/2001
EP 2397763 A1 12/2011

OTHER PUBLICATIONS

International Search Report and Written Opinion from PCT Application Serial No. PCT/US2015/011294, dated Apr. 13, 2015, 13 pages.
(Continued)

*Primary Examiner* — Alexander M Valvis
*Assistant Examiner* — Joseph A Greenlund
(74) *Attorney, Agent, or Firm* — Kinney & Lange, P.A.

(57) ABSTRACT

One embodiment includes a fuel injector. The fuel injector assembly comprises a conduit for conveying fuel from a fuel inlet to a nozzle. The conduit is located in a support, with the conduit, the nozzle, and the support being a single unitary piece. A thermally compliant feature is located at the nozzle which allows the fuel injector to adjust for differential thermal expansion.

6 Claims, 4 Drawing Sheets

(52) U.S. Cl.
CPC ...... *F05D 2230/53* (2013.01); *F05D 2240/35* (2013.01); *F05D 2250/61* (2013.01); *F05D 2260/231* (2013.01); *F05D 2300/10* (2013.01); *F23R 2900/00005* (2013.01)

(58) Field of Classification Search
USPC ................................ 239/397.5; 60/740, 742
See application file for complete search history.

(56) References Cited

U.S. PATENT DOCUMENTS

| | | | | |
|---|---|---|---|---|
| 6,457,316 | B1* | 10/2002 | Czachor | F23R 3/283 |
| | | | | 60/742 |
| 8,015,815 | B2* | 9/2011 | Pelletier | F23R 3/14 |
| | | | | 239/132 |
| 8,181,891 | B2 | 5/2012 | Ziminsky et al. | |
| 8,240,151 | B2* | 8/2012 | Pelletier | F23D 11/107 |
| | | | | 60/740 |
| 8,336,313 | B2* | 12/2012 | McMasters | B23P 6/007 |
| | | | | 60/742 |
| 9,822,980 | B2* | 11/2017 | Hawie | F23R 3/28 |
| 9,939,157 | B2* | 4/2018 | Patel | F23R 3/286 |
| 9,958,152 | B2* | 5/2018 | Ramier | F23L 7/002 |
| 10,196,983 | B2* | 2/2019 | Cadman | F02C 7/24 |
| 10,364,988 | B2* | 7/2019 | Hawie | F23R 3/28 |
| 2009/0255256 | A1 | 10/2009 | McMasters et al. | |
| 2009/0255262 | A1* | 10/2009 | McMasters | F23R 3/14 |
| | | | | 60/742 |
| 2009/0256003 | A1 | 10/2009 | McMasters et al. | |
| 2010/0307159 | A1 | 12/2010 | Toon | |
| 2011/0247590 | A1 | 10/2011 | Donovan | |
| 2011/0308254 | A1* | 12/2011 | Cowan | F23D 17/002 |
| | | | | 60/740 |
| 2014/0090394 | A1* | 4/2014 | Low | F23R 3/28 |
| | | | | 60/776 |
| 2016/0348913 | A1* | 12/2016 | Ott | F23R 3/28 |

OTHER PUBLICATIONS

Extended European Search Report for EP Application No. 15741062.2, dated Jan. 23, 2017, 7 pages.

\* cited by examiner

THERMALLY COMPLIANT ADDITIVELY MANUFACTURED FUEL INJECTOR

BACKGROUND

The present embodiments relate to gas turbine engines and, more particularly, to fuel injectors used in gas turbine engines.

A fuel injector is used to convey fuel from a manifold fuel supply to a combustor, where the fuel is mixed with pressurized air and ignited to form hot combustion gases. A simplex fuel injector conveys fuel internally through a single fuel circuit to a nozzle, whereas a duplex fuel injector conveys the fuel internally through both a primary fuel circuit and a secondary fuel circuit to the nozzle. Once the fuel reaches the nozzle, it is ejected into the combustor. The exterior of the fuel injector is thus exposed to the hot combustor temperatures, while the interior of the fuel injector is relatively insulated. Differences in temperature between exterior fuel injector features and interior fuel injector features can exceed several hundreds of degrees (Fahrenheit). This results in differential thermal expansion or displacement of the exterior features relative to the interior features. As a result, stresses are imparted on the interior features, including the fuel circuit or circuits, which can produce problems such as leaks, coking contamination, and fluid dynamic concerns.

Fuel injector assembly designs have attempted to remedy the problems caused by differential thermal expansion. Generally, this is done by using a compliant seal threaded into the fuel injector assembly to allow for thermal expansion between the fuel-cooled circuit and the hot fuel injector support. Additionally, a compliant gap has been implemented between the hot fuel injector support and the cold fuel circuit to allow for thermal expansion between the fuel circuit and the hot fuel injector support. However, manufacturing fuel injectors to withstand differential thermal expansion requires a complex assembly and the joining of over thirty individual parts. Furthermore, braze joints are also generally used, which increases the time needed to complete manufacturing, the manufacturing complexity, the fuel injector weight, and the fuel injector cost.

SUMMARY

In one embodiment a fuel injector comprises a conduit, a nozzle, and a support formed as a single unitary piece. The conduit conveys fuel from a fuel inlet to the nozzle, and is located in the support. The single unitary piece includes a thermally compliant feature, located at the nozzle, which allows the fuel injector to adjust for differential thermal expansion.

Another embodiment includes a method of making a fuel injector. The fuel injector is built layer by layer through use of additive manufacturing to contain a conduit, a nozzle, and a support. The conduit, the nozzle, and the support are additively built as a single unitary piece. The conduit is disposed inside of the support and conveys fuel from a fuel inlet to the nozzle. A thermally compliant feature, which is built at the nozzle as part of the single unitary piece, allows the fuel injector to adjust for differential thermal expansion.

DETAILED DESCRIPTION

A fuel injector that will be subject to a thermal gradient during operation can be additively manufactured to be a single unitary piece containing a thermally compliant feature which allows the fuel injector to adjust for differential thermal expansion. The thermally compliant feature prevents stresses from being imparted on fuel injector features which undergo less thermal expansion than fuel injector features exposed to higher temperatures. Because the fuel injector is a single unitary piece containing the thermally compliant feature, the complex assemblies and parts required when conventionally manufacturing a fuel injector to be thermally compliant are avoided. Additionally, a variety of thermally compliant feature geometries are possible, many of which are cost-prohibitive or impossible when using conventional manufacturing.

Figure 1A:
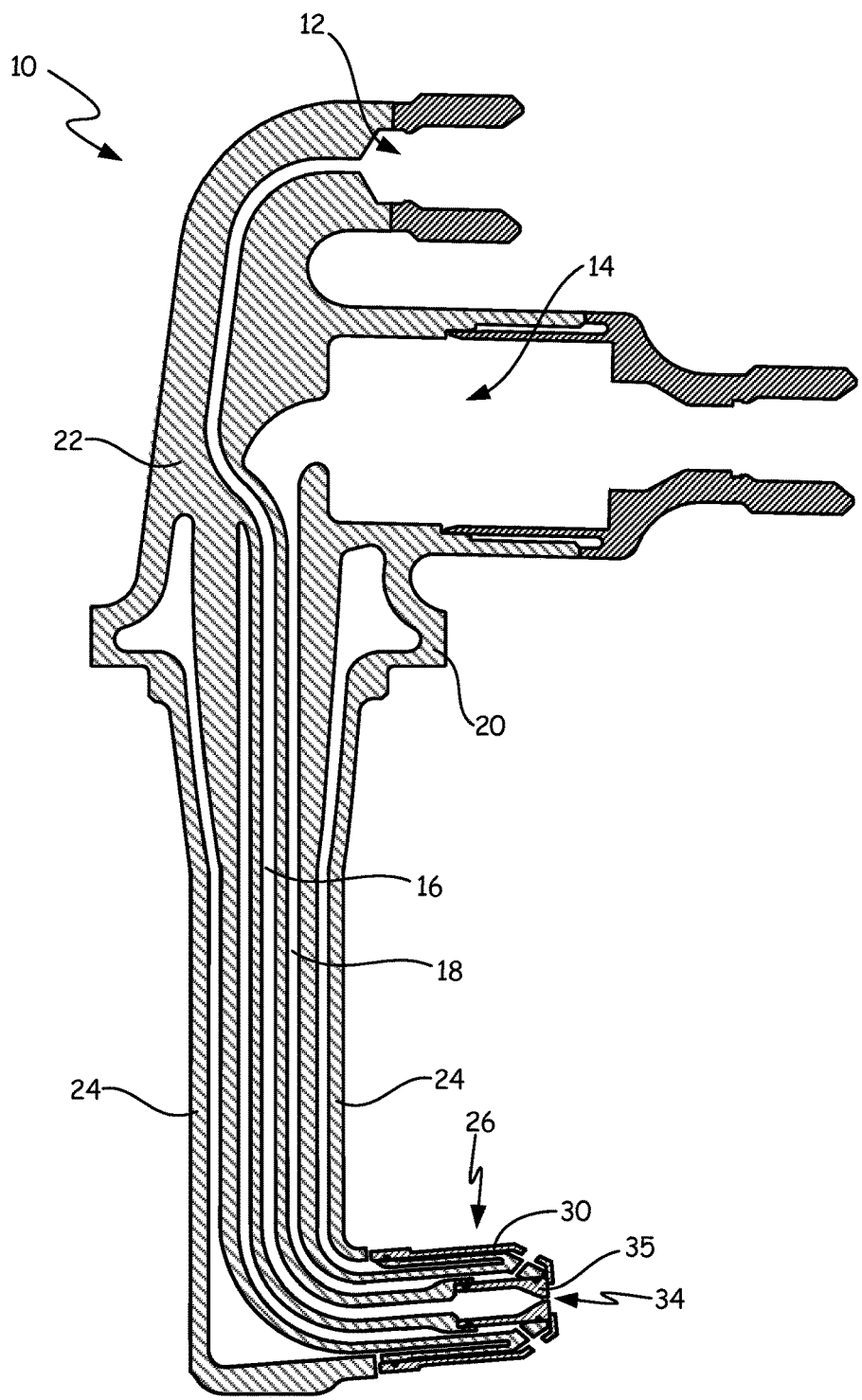
FIG. 1A shows a cross-sectional view of one embodiment of a fuel injector.

FIG. 1A shows a cross-sectional view of one embodiment of fuel injector 10. Fuel injector 10 is a duplex type fuel injector with co-concentric fuel circuitry and includes primary fuel inlet 12, secondary fuel inlet 14, primary fuel circuit 16, and secondary fuel circuit 18. Also included are mount flange 20, injector support 22, heat shield 24, and nozzle 26. Wear sleeve 30 and pressure atomizing tip detail 35 containing pressure atomizing tip 34 fixed within, are also shown, and these are separate components of nozzle 26 attached to fuel injector 10 after fuel injector 10 has been additively manufactured.

Primary fuel circuit 16, a conduit, is in fluid connection with primary fuel inlet 12 on one end, and pressure atomizing tip 34 on the other end. Secondary fuel circuit 18, a conduit, is in fluid connection with secondary fuel inlet 14 on one end, and nozzle 26 on the other end. Primary fuel circuit 16 is encased in secondary fuel circuit 18, and secondary fuel circuit 18 is encased in injector support 22. Injector support 22 constitutes the structural body of fuel injector 10. Heat shield 24 makes up the exterior surface of fuel injector 10. Mount flange 20 provides a means for mounting fuel injector 10 to an outer casing of a gas turbine engine combustor (not shown), such that primary fuel inlet 12 and secondary fuel inlet 14 are located outside of the casing, and nozzle 26 is located inside of the casing. Fuel is conveyed to nozzle 26 by primary fuel circuit 16 and secondary fuel circuit 18. At nozzle 26, fuel is ejected into the combustor, where the fuel is mixed with compressed air and ignited, forming hot combustion gases.

Fuel injector 10 is a single unitary piece. However, as described later for FIG. 1B, wear sleeve 30 and pressure atomizing tip detail 35 containing pressure atomizing tip 34, which are components of nozzle 26, are not part of single unitary fuel injector 10, but rather are separate components attached at joints to the single unitary piece. The term "single unitary piece" is used herein to indicate that the associated piece, such as fuel injector 10, is made as a single piece during manufacturing. Therefore, a single unitary piece differs from a piece which has been made from multiple separately manufactured components that have been joined together, such as through welding or brazing. Fuel injector 10 is formed as a single unitary piece through use of an additive manufacturing (or rapid manufacturing)

process. Additive manufacturing processes include, for example, Selective Laser Sintering (SLS), Electron Beam Melting (EBM), Electron Beam Sintering (EBS), Direct Metal Laser Sintering (DMLS), Laser Net Shape Manufacturing (LNSM), and Electron Beam Wire Deposition (EBWD). In general, additive manufacturing applies a heat source to powders to successively form individual layers of the desired part, such that the desired part is ultimately built through layer by layer construction. Fuel injector 10 can be at least partially made of nickel, Waspaloy, Stellite, titanium, steel, stainless steel, cobalt, chrome, or alloys thereof.

External features of fuel injector 10, such as injector support 22 and heat shield 24, are exposed to the high combustor temperatures, yet the internal features of injector support 10, such as primary fuel circuit 16 and secondary fuel circuit 18, stay relatively cool. Consequently, features of fuel injector 10 are subject to differential thermal expansion caused by the thermal gradient. If the differential thermal expansion is unaccounted for, it can induce undesirable stresses in fuel injector 10 which may lead to leaks, coking contamination, and fluid dynamic concerns. To adjust for the differential thermal expansion, fuel injector 10 contains thermally compliant feature 28 at nozzle 26, shown in FIG. 1B.

Figure 1B:
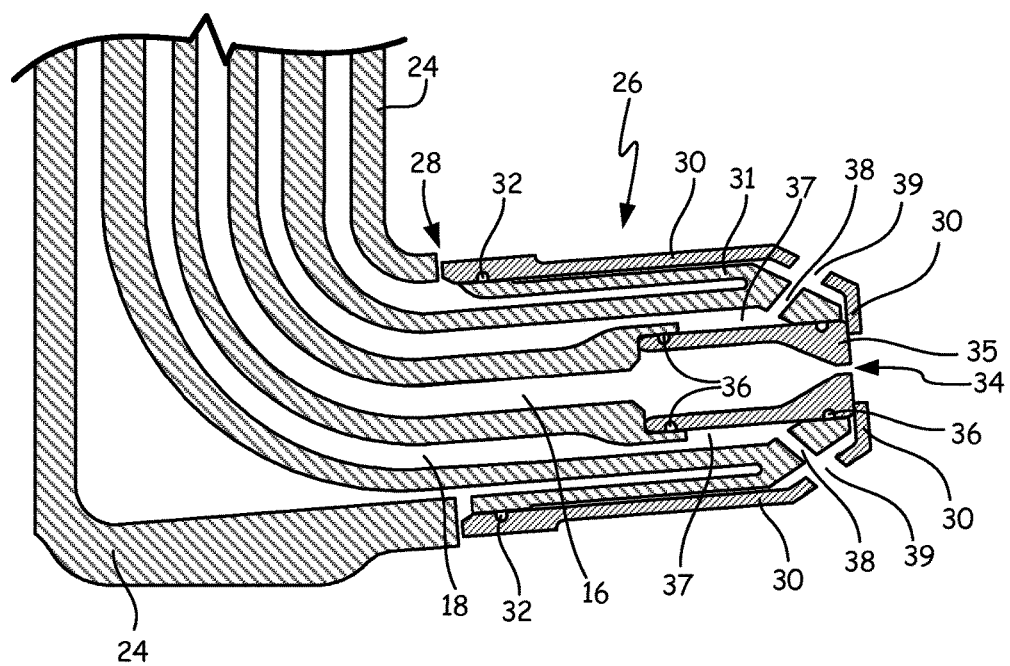
FIG. 1B shows a cross-sectional view of an enlarged portion of the fuel injector of FIG. 1A.

FIG. 1B is a cross-sectional view of an enlarged portion of fuel injector 10 of FIG. 1A. FIG. 1B includes primary fuel circuit 16 encased in secondary fuel circuit 18, heat shield 24, nozzle 26, thermally compliant feature 28, wear sleeve 30, nozzle tip structure 31, braze joints 32, pressure atomizing tip 34 fixed in pressure atomizing tip detail 35, braze joints 36, passages 37, and exit orifices 38 and 39. Primary fuel circuit 16 is in fluid connection with pressure atomizing tip 34. Fuel conveyed by primary fuel circuit 16 enters pressure atomizing tip 34 and is sprayed by pressure atomizing tip 34 into the combustor (not shown). Fuel conveyed by secondary fuel circuit 18 is also delivered into the combustor. Secondary fuel circuit 18 is in fluid connection with passages 37 such that fuel enters passages 37 from secondary fuel circuit 18 and travels out exit orifices 38 and 39 and into the combustor. Heat shield 24 is attached to the internal fuel circuitry, primary fuel circuit 16 and secondary fuel circuit 18, only at mount flange 20 (shown in FIG. 1A). Wear sleeve 30, which acts to prevent wear at a seal interface with the combustor, extends around the exterior of nozzle 26 and is attached to nozzle tip structure 31 by braze joints 32. Pressure atomizing tip 34 is fixed within pressure atomizing tip detail 35. Pressure atomizing tip detail 35, and thus pressure atomizing tip 34, is secured in place within nozzle 26 by braze joints 36. Wear sleeve 30 and pressure atomizing tip detail 35 containing pressure atomizing tip 34 are not part of the single unitary piece that is fuel injector 10. Rather, they are separate components that need to be attached to the single unitary piece, for example by braze joints 32 and 36, respectively. To signify this in the FIGS., matching hatchings used for wear sleeve 30 and pressure atomizing tip detail 35 containing pressure atomizing tip 34 differ from any hatchings included on any feature of single unitary piece fuel injector 10.

Thermally compliant feature 28 shown in FIG. 1B is a gap between heat shield 24 and nozzle tip structure 31 at nozzle 26, and provides for a thermally compliant fuel injector 10. As described previously for FIG. 1A, external features of fuel injector 10, such as injector support 22, heat shield 24, and nozzle 26 components wear sleeve 30 and nozzle tip structure 31, are exposed to higher temperatures than internal features of fuel injector 10, such as primary fuel circuit 16 and secondary fuel circuit 18. As a result, the external features of fuel injector 10, including heat shield 24, will undergo differential thermal expansion relative to the internal features of fuel injector 10, including primary fuel circuit 16 and secondary fuel circuit 18. This differential thermal expansion can induce stresses in fuel injector 10, which if unaccounted for can result in failure of fuel injector 10 during operation.

Thermally compliant feature 28 prevents failure of fuel injector 10 due to differential thermal expansion by providing heat shield 24 with expansive, or displacement, capacity and allowing heat shield 24 to expand independent of other fuel injector 10 features. Although heat shield 24 is attached to the internal fuel circuitry, primary fuel circuit 16 and secondary fuel circuit 18, at mount flange 20 (shown in FIG. 1A), thermally compliant feature 28 allows heat shield 24 to grow when exposed to relatively higher temperatures without stresses being imparted on internal features of fuel injector 10, such as primary fuel circuit 16 and secondary fuel circuit 18. The size of the gap that is thermally compliant feature 28 will vary as a function of the material from which heat shield 24 is made, specifically the coefficient of thermal expansion of the material, and the temperature to which heat shield 24 is exposed. During operation, heat shield 24 expands into the location of thermally compliant feature 28, and therefore, the greater extent to which heat shield 24 grows, relative to primary fuel circuit 16 and secondary fuel circuit 18, occurs without primary fuel circuit 16 and secondary fuel circuit 18 experiencing stress. Consequently, problems associated with differential thermal expansion of fuel injector 10, such as such as leaks, coking contamination, and fluid dynamic concerns, are avoided while at the same time the benefits afforded by fuel injector 10 being a thermally compliant single unitary piece are gained.

Figure 2A:
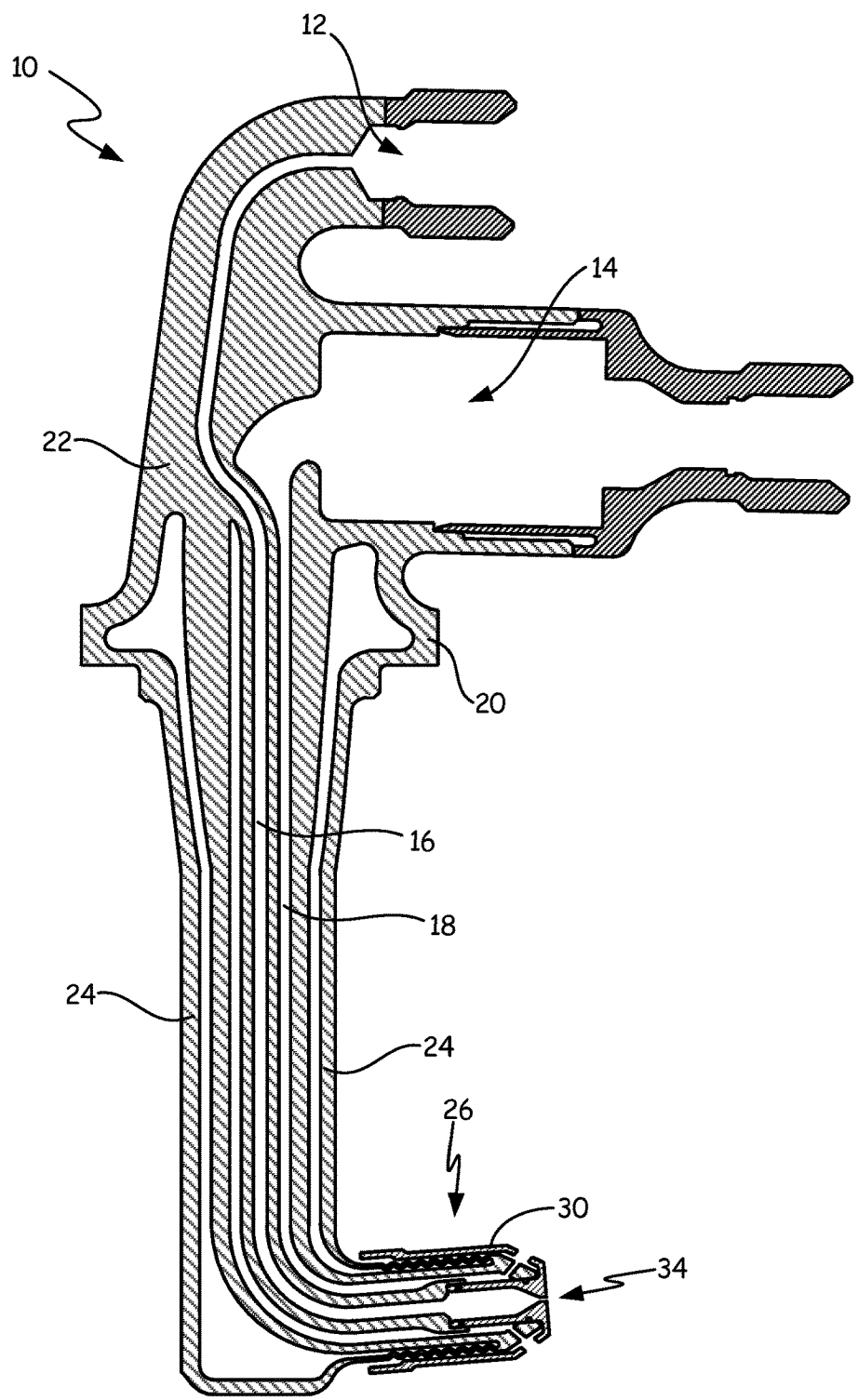
FIG. 2A shows a cross-sectional view of another embodiment of a fuel injector.
Figure 2B:
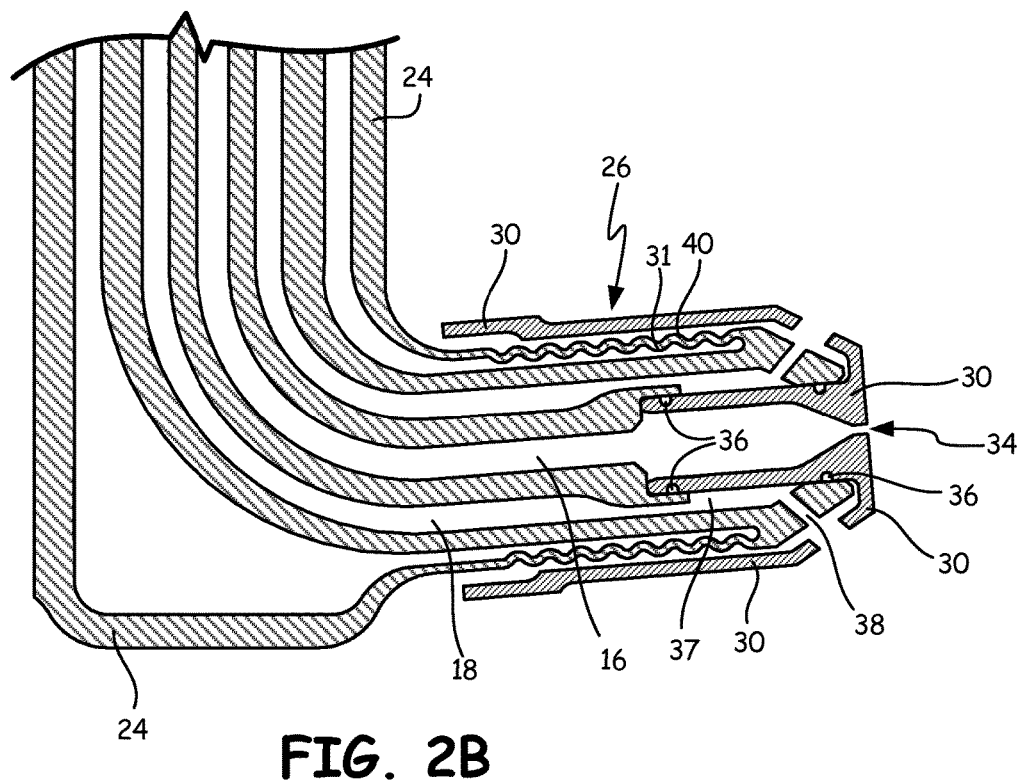
FIG. 2B shows a cross-sectional view of an enlarged portion of the fuel injector of FIG. 2A.

FIG. 2A shows a cross-sectional view of another embodiment of fuel injector 10, containing a thermally compliant feature at nozzle 26 (described for FIG. 2B). References in FIG. 2A are intended to signify the same features as those described for FIG. 1A. The differences between FIGS. 1A and 2A are present in nozzle 26, and will be described below for FIG. 2B.

FIG. 2B shows a cross-sectional view of an enlarged portion of fuel injector 10 of FIG. 2A. Wear sleeve 30 still extends around nozzle 26 but is no longer attached to nozzle tip structure 31 as was the case in FIG. 1B. Instead, wear sleeve 30 is attached at nozzle 26 by braze joints 36 with wear sleeve 30 forming, and taking the place of, what was an additional pressure atomizing tip detail 35 component in FIG. 1B. As a result, pressure atomizing tip 34 is fixed within wear sleeve 30 at nozzle 26. Additionally, heat shield 24 here is attached to the internal fuel circuitry, primary fuel circuit 16 and secondary fuel circuit 18, at both mount flange 20 (as was described in FIG. 1B) and nozzle tip structure 31—heat shield 24 and nozzle tip structure 31 are connected and there no longer is a gap between heat shield 24 and nozzle tip structure 31.

Although no longer a gap, nozzle tip structure 31 now contains thermally compliant feature 40 as part of the configuration of nozzle tip structure 31. Thermally compliant feature 40 is an elastic portion of nozzle tip structure 31 and as such provides displacement capacity for heat shield 24 when heat shield 24 is exposed to higher temperatures than internal features of fuel injector 10. Thus, elastic thermally compliant feature 40 at nozzle tip structure 31 allows heat shield 24 to grow independent of other fuel injector 10 features. This in turn prevents stresses from being imparted on relatively cooler fuel injector 10 features when heat shield 24 is exposed to higher temperatures and consequently grows to a greater extent. During operation, when heat shield 24 expands thermally compliant feature 40 will change in configuration, as a result of its elasticity, to accommodate displacement of heat shield 24 resulting from expansion. Elastic thermally compliant feature 40 geometry can be corrugated as shown here, and as such allows for change in the geometric configuration of elastic thermally compliant feature 40 during operation to accommodate displacement of heat shield 24. But, elastic thermally compliant geometry can also include, for example, perforated, spiral, or other geometries that allow for high displacement, of for example external features of fuel injector 10, with tolerable or no stresses placed on features which experience relatively less displacement, including internal features of fuel injector 10. Such elastic thermally compliant geometries can be made to be part of the single unitary piece that is fuel injector 10 through use of additive manufacturing.

Consequently, problems associated with differential thermal expansion of fuel injector 10, such as such as leaks, coking contamination, and fluid dynamic concerns, are avoided while at the same time the benefits afforded by fuel injector 10 being a thermally compliant single unitary piece are gained. However, fuel injector 10 does still contain separate components fuel atomizing tip 34 and wear sleeve 30 attached at braze joints 36.

Although fuel injector 10 is shown as a duplex fuel injector, the embodiments apply equally to all other various types of fuel injectors, such as, for example, simplex fuel injectors where there is no secondary fuel circuit 18 (and thus also no secondary fuel inlet 14) and fuel injectors with noncoconcentric fuel circuitry. Furthermore, while the embodiments shown herein contain thermally compliant features in relation to heat shield 24 and nozzle tip structure 31, thermally compliant features can be built on any features of single unitary piece fuel injector 10 that are subject to thermal gradients. For example, it may be desirable to include a thermally compliant feature as part of secondary fuel circuit 18 such that secondary fuel circuit 18 is provided with displacement capacity and allowed to expand independent of primary fuel circuit 16, thus avoiding imparting stresses on primary fuel circuit 16 when secondary fuel circuit 18 is subject to a thermal gradient and expands to a greater extent. Furthermore, a thermally compliant feature can be of any geometry that provides independent displacement capacity for the fuel injector feature subject to a thermal gradient, and therefore, avoids imparting stresses on other fuel injector features. For example, such thermally compliant feature geometries could include, but are not limited to, various types of bends, including joggle bends, and a plurality of fold-over geometries which all allow for independent displacement capacity upon differential thermal expansion.

Forming a thermally compliant feature as part of a single unitary piece during an additive build allows the single unitary piece to adjust for thermal gradients ranging from a few degrees to several hundred degrees (Fahrenheit). Significantly, additively manufacturing the thermally compliant single unitary piece makes possible numerous thermally compliant feature geometries which provide independent displacement capacity that otherwise have been cost-prohibitive or impossible to manufacture conventionally, while at the same time complex conventional manufacturing parts and assemblies are averted, reducing the end cost and weight and increasing the reliability and expected life of the single unitary piece.

When discussing Waspaloy, it is intended this refer to the following approximate chemical composition by weight: 58% nickel; 19% chromium; 13% cobalt; 4% molybdenum; 3% titanium; and 1.4% aluminum. When discussing Stellite, it is intended this refer to an alloy with various amounts of four to six of the following elements: cobalt, nickel, iron, aluminum, boron, carbon, chromium, manganese, molybdenum, phosphorus, sulfur, silicon, and titanium. All of the chemical compositions stated above can include incidental impurities.

DISCUSSION OF POSSIBLE EMBODIMENTS

The following are non-exclusive descriptions of possible embodiments of the present invention.

A fuel injector assembly comprising a conduit for conveying fuel from a fuel inlet to a nozzle; a support in which the conduit is located, wherein the conduit, the nozzle, and the support are a single unitary piece; and a thermally compliant feature at the nozzle which allows the fuel injector to adjust for differential thermal expansion between the conduit and nozzle.

The fuel injector assembly of the preceding paragraph can optionally include, additionally and/or alternatively, any one or more of the following features, configurations and/or additional components:

The single unitary piece is made through an additive manufacturing process.

A heat shield on an exterior of the support, wherein the conduit, the nozzle, the support, and the heat shield are a single unitary piece.

The conduit comprises a primary fuel circuit encased in a secondary fuel circuit.

The thermally compliant feature comprises a gap in the nozzle.

The gap is located between a heat shield and a nozzle tip structure.

The thermally compliant feature comprises an elastic nozzle geometry for at least part of the nozzle.

The elastic nozzle geometry is corrugated.

The fuel injector is at least partially made of nickel, Waspaloy, Stellite, titanium, steel, stainless steel, cobalt, chrome, or alloys thereof.

A method of making a fuel injector, the method comprising building the fuel injector layer by layer through use of additive manufacturing to contain a conduit, a nozzle, and a support; wherein the conduit, the nozzle, and the support are additively built to be a single unitary piece; and wherein the conduit is disposed inside of the support and conveys fuel from a fuel inlet to the nozzle; and building a thermally compliant feature at the nozzle as part of the single unitary piece which allows the fuel injector to adjust for differential thermal expansion.

The method of the preceding paragraph can optionally include, additionally and/or alternatively, the following techniques, steps, features and/or configurations:

The thermally compliant feature comprises a gap in the nozzle.

The thermally compliant feature comprises an elastic geometry for at least part of the nozzle.

Building the elastic geometry to be corrugated.

The conduit is built to comprise a primary fuel circuit encased in a secondary fuel circuit.

A heat shield is built on an exterior of the support, wherein the conduit, the nozzle, the support, and the heat shield are a single unitary piece.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fuel injector comprising:
   a conduit for conveying fuel from a fuel inlet to a nozzle;
   a support in which the conduit is located;
   a heat shield on an exterior of the support, wherein the conduit, the nozzle, the support, and the heat shield are a single unitary piece; and
   a thermally compliant feature at the nozzle which allows the fuel injector to adjust for differential thermal expansion;
   wherein the thermally compliant feature comprises a gap in the nozzle, wherein the gap axially separates the heat shield and a nozzle tip structure along a fluid axis.

2. The fuel injector of claim 1, wherein the single unitary piece is made through an additive manufacturing process.

3. The fuel injector of claim 1, wherein the conduit comprises a primary fuel circuit encased in a secondary fuel circuit.

4. The fuel injector of claim 1, wherein the fuel injector is at least partially made of nickel, Waspaloy, Stellite, titanium, steel, stainless steel, cobalt, chrome, or alloys thereof.

5. A method of making a fuel injector, the method comprising:
   building the fuel injector layer by layer through use of additive manufacturing to contain a conduit, a nozzle, and a support; wherein the conduit is disposed inside of the support and conveys fuel from a fuel inlet to the nozzle;
   building a heat shield on an exterior of the support, wherein the conduit, the nozzle, the support, and the heat shield are a single unitary piece; and
   building a thermally compliant feature at the nozzle as part of the single unitary piece which allows the fuel injector to adjust for differential thermal expansion, wherein the thermally compliant feature comprises a gap in the nozzle and wherein the gap axially separates the heat shield and a nozzle tip structure along a fluid axis.

6. The method of claim 5, wherein the conduit is built to comprise a primary fuel circuit encased in a secondary fuel circuit.

* * * * *